United States Patent [19]

Bierman et al.

[11] Patent Number: 4,836,854
[45] Date of Patent: Jun. 6, 1989

[54] STABILIZATION OF SETTING TIMES OF PHOSPHATE-BONDED MAGNESIA CEMENTS

[75] Inventors: Laurence W. Bierman; Samuel M. Polinsky, both of Pocatello, Id.

[73] Assignee: J. R. Simplot Co., Boise, Id.

[21] Appl. No.: 625,443

[22] Filed: Jun. 27, 1984

[51] Int. Cl.$^4$ ............................................. C04B 9/04
[52] U.S. Cl. ..................................... 106/85; 106/105; 106/121; 501/111
[58] Field of Search ................ 106/121, 85, 105, 106; 501/111, 121

[56] References Cited

U.S. PATENT DOCUMENTS

| | | | |
|---|---|---|---|
| 2,479,504 | 8/1949 | Moore et al. | 106/121 |
| 3,285,758 | 11/1966 | Limes et al. | 501/114 X |
| 3,475,188 | 10/1969 | Woodhouse et al. | 501/111 |
| 3,879,209 | 4/1975 | Limes et al. | 106/85 |
| 3,960,580 | 6/1976 | Stierli et al. | 106/85 X |
| 4,059,455 | 11/1977 | Limes et al. | 106/85 |
| 4,152,167 | 5/1979 | Horvitz et al. | 106/85 X |
| 4,324,592 | 4/1982 | Patel et al. | 106/121 |
| 4,394,174 | 7/1983 | Tomic | 106/85 |
| 4,755,227 | 7/1988 | Sherif et al. | 100/85 |

FOREIGN PATENT DOCUMENTS 1014446  6/1965  United Kingdom .

Primary Examiner—William R. Dixon, Jr.
Assistant Examiner—Ann M. Knab
Attorney, Agent, or Firm—Gregory O. Garmong

[57] ABSTRACT

A process and product for achieving uniform, stabilized working and setting times for phosphate-bonded magnesia cements, wherein a solid phosphate is mixed with an aqueous ammonium phosphate solution and magnesium oxide to form a cement. The solid phosphate may be provided dry or in a slurry, and may be first mixed with the ammonium phosphate solution or the magnesium oxide. Introduction of the solid phosphate into the cement stabilizes the setting time of the cement, which otherwise may vary from a few minutes to several hours, depending upon the characteristics of the ammonium phosphate solution. The ammonium phosphate solution may be supplied as a 10-34-0 composition that is readily available commercially. In one embodiment of the invention, the solid phosphate is provided as an ammonium phosphate mixture of an 18-46-0 composition, having an ammonium phosphate content above the solubility limit of ammonium phosphate in water. In another embodiment, dry phosphate is mixed with the magnesium oxide, before the ammonium phosphate solution is added.

26 Claims, No Drawings

STABILIZATION OF SETTING TIMES OF PHOSPHATE-BONDED MAGNESIA CEMENTS

BACKGROUND OF THE INVENTION

The present invention relates to phosphate-bonded magnesia cements, and, more particularly, to a process and reactant for achieving uniform setting times of such cements.

Cements are hard, rock-like materials formed by reacting two or more components together, and then allowing the mixture to harden as the reaction proceeds. In the best known and most widely used type of cement, termed Portland cement, the hardening is generally based upon the reaction of calcium oxide and silicates. Such cements, which are commonly used for highway and sidewalk construction, have a "skinning time", the time before visible hardening or formation of a surface skin takes place, of on the order of an hour, and a "setting time", the time to achieving hardening throughout a volume, of hours to days. The relatively long skinning and setting times allow the preparation of large batches and the placing of the cement into forms conveniently and without undue haste, a requirement for many applications such as highway construction. Cements may also be conveniently utilized in mixtures with fillers such as fibers, rocks or sand, the product then being known as a "concrete."

Cements based on other chemical reactions, such as, for example, the reaction of magnesium oxide (also termed magnesia) with various salts, have different properties from those based upon the calcium oxidesilicate reaction. For example, the reaction between magnesium oxide and magnesium chloride produces a cement having a setting time of typically about 2 to about 8 hours. Such cements, termed Sorel cements, are often used for cement flooring in buildings.

In another type of magnesia cement, termed a phosphate-bonded magnesia cement, a phosphate such as ammonium phosphate is mixed with the magnesia, to form the cement. Phosphate-bonded magnesia cements are noteable for their very short skinning and setting times, which may be as little as two minutes and five minutes, respectively. These very short skinning and setting times allow phosphate-bonded magnesia cements to be used in many applications, such as coatings for walls, that would not be possible with cements having longer skinning and setting times, because such cements tend to move from their applied position before hardening.

In one approach to preparing phosphate-bonded magesia cements, the ammonium phosphate is provided in a liquid solution which may be conveniently prepared utilizing the technologies well known in the art of fertilizer preparation. Fertilizers which contain primarily nitrogen and phosphorus present these elements in the form of ammonium phosphate, and such fertilizers may also be used as the source of ammonimum phosphate in preparing phosphate-bonded magnesia cement. In one approach, a 10-34-0 composition having the ammonium phosphate fully dissolved into solution, and also having a large proportion of the phosphate present as polyphosphates, is widely available commercially as a fertilizer material and is also widely used commercially in the production of phosphate-bonded magnesia cements. The liquid fertilizer is mixed with the solid magnesium oxide, any fillers which are desired and possibly other ingredients, and immediately applied to the form or surface within the skinning time limitation. Setting occurs within a few minutes after application. (The "N-P-K" shorthand notation for fertilizer compositions will be utilized herein, the N denoting the percent by weight of ammoniacal nitrogen, the P denoting the percent by weight of phosophorus expressed as $P_2O_5$, and the K denoting the potassium content in weight percent.)

The very short skinning and setting times of phosphate-bonded magnesia cements are necessary in some applications, but in other applications it is desirable to have slightly longer skinning and setting times. Several approaches have been discovered for lengthening the skinning and setting times by a few minutes, while retaining the strength properties of the hardened cement, which ordinarily decrease with increasing setting time. For example, the addition of oxy-boron or sodium chloride compounds and specification of particular phosphate chemistries in the ammonium phosphate solution have been proposed as approaches for lengthening the skinning and setting times. On the whole, such techniques do achieve some lengthening of the skinning and setting times.

It is also observed that there may be a large degree of variation in the skinning and setting times of phosphate-bonded magnesia cements, particularly when using the ammonium phosphate fertilizer materials that are mass produced and available on a widespread basis. That is, 10-34-0 compositions are prepared by many different manufactures, and the processes used to prepare the compositions may vary from manufacturer to manufacturer. Because the primary purpose of the production of such 10-34-0 solutions is for agricultural fertilizers, the manufacturers of such compositions do not standardize their manufacturing operations so as to meet the requirements of the producers of magnesia cements.

Consequently, the skinning and setting times of phosphate-bonded magnesia cements prepared using various 10-34-0 ammonium phosphate solutions available from different manufacturers, and even produced by the same manufacturer at different times, exhibit wide variations. For example, the setting times may vary from about 7 minutes to greater than 10 hours, when using nominal 10-34-0 compositions of the ammonium phosphate solution. This variability poses a significant drawback to the use of phosphate-bonded magnesia cements, because the user cannot readily predict when the cement structure will be available for use after the cement is applied. The ordinarily short setting times of the phosphate-bonded magnesia cements should allow the structures to be used shortly after the cement is applied, but this advantage is significantly impaired when variability increases the possible setting time to several hours, in an unpredictable fashion.

Accordingly, there exists a need for some approach to achieving uniform skinning and setting times for phosphate-bonded magnesia cement. To date, no such approach based in the control of chemistry has been proposed. It is conceivable that, if the causes of variation could first be discovered, extremely tight specifications could be drawn on the ammonium phosphate material, so that solutions could be prepared meeting these tight specifications and also so that incoming material could be screened to ensure that it meets the specifications. However, this approach would increase the cost of phosphate-bonded magnesia cements, by requiring that manufacturers produce a special cement-grade ammonium phosphate material, which would almost certainly result in increased price and reduced number of sources for the material. Thus, it would be desirable to have a technique for controlling the chemistry of the cement reaction to achieve relatively uniform skinning and setting times for phosphate-bonded magnesia cements, without imposing unduly narrow restrictions on the ammonium phosphate reactant. The present invention fulfills this need, and further provides related advantages.

SUMMARY OF THE INVENTION

The present invention resides in a process for preparing phosphate-bonded magnesia cements having relatively uniform skinning and setting times independent of the polyphosphate content and other chemistry of an ammonium phosphate solution used in the reaction. The modification to the chemistry of the reaction preferably involves a relatively small addition to the cement, which addition is inexpensive and readily available. The addition greatly reduces the variability of the setting time of the phosphate-bonded magnesia cement, without any need for placing restrictions on the precise chemistry of the ammonium phosphate solution. Consequently, phosphate-bonded magnesia cements may be used with the assurance that the cement will harden within a predictable length of time, so that it is no longer necessary to establish overly long waiting times before the cement structure can be used to account for the possibility that any particular cement will have a long setting time.

In accordance with the invention, a phosphate-bonded magnesia cement is prepared by mixing together a source of soluble ammonia and phosphate, a solid phosphate, and magnesium oxide. In accordance with another aspect of the invention, reactants useful in preparing such cements may be prepared by mixing the source of soluble ammonia and phosphate with the solid phosphate, or mixing the magnesium oxide with the solid phosphate. Either of these reactants can then be later used as an ingredient for mixing with the remaining component to form a cement. Preferably, the aqueous solution containing ammonia and phosphate is a commercially available product such as 10-34-0 fertilizer composition. The solid phosphate may be provided as an aqueous mixture of solid ammonium phosphate in water, such as an 18-46-0 fertilizer composition, wherein the ammonium phosphate content is above its solubility limit so that a solid phase is present. The solid phosphate may also be provided in a divided solid form.

In one embodiment, the solution containing ammonia and phosphate is of 10-34-0 composition. The mixture containing the solid ammonium phosphate is of 18-46-0 composition. These two ingredients may conveniently be mixed together at a central processing location to form a reactant chemical, and stored in this form for extended periods of time without losing effectiveness as a reactant in achieving a stabilized setting time. When it is desired to prepare the cement, the reactant prepared in accordance with this embodiment is mixed with magnesium oxide, and possibly fillers and other chemicals, to produce a product which hardens within a predictable length of time of about 12.5±3.5 minutes, regardless of the exact chemistry of the 10-34-0 ammonium phosphate solution.

In another embodiment, the phosphate may be provided in a divided solid form. For example, a finely divided phosphate may be mixed with the magnesium oxide, and then the ammonium phosphate solution added. In one alternative, the ammonium phosphate solution, the phosphate in the form of a dry solid or aqueous slurry, and the magnesium oxide are mixed together essentially simultaneously.

The solid phosphate may be provided in a variety of forms, such as monoammonium phosphate, diammonium phosphate, monosodium phosphate, disodium phosphate, monopotassium phosphate, dipotassium phosphate, or mixtures thereof, used either in dry or slurry form. Increasing amounts of the solid phosphate produce successively shorter, but stabilized, skinining and setting times.

From the foregoing it will be appreciated that the present invention represents an important advance in the field of phosphate-bonded magnesia cements. Cements having relatively uniform, predictable skinning and setting times and acceptable strengths may be prepared using commercially available ingredients, decreasing the variability of the process without significantly increasing the cost of the cement or its preparation. Other features and advantages of the present invention will become apparent from the following more detailed description, which illustrates, by way of example, the principles of the invention.

DETAILED DESCRIPTION OF THE PREFERRED EMBODIMENT

The preferred embodiments of the present invention will be described in relation to a commercially preferred approach for manufacturing phosphate-bonded magnesia cements. As described in U.S. Pat. Nos. 3,879,209 and 4,059,455, whose disclosures are herein incorporated by reference, phosphate-bonded magnesia cements are commonly prepared by combining an aqueous ammonium phosphate solution with magnesium oxide. Further additions of inert particulates such as fibers, rock, sand, brick, minerals or sized minerals produce concrete. As disclosed at column 5, lines 1–36 of U.S. Pat. No. 3,879,209, a preferred ammonium phosphate-containing chemical is an agricultural fertilizer grade aqueous solution having a nominal analysis of 10-34-0.

Aqueous ammonium phosphate solutions useful in the manufacture of phosphate-bonded magnesia cements may be prepared by a variety of techniques known to those skilled in the art, such as, for example, the reaction of polyphosphoric acid with concentrated ammonium hydroxide or the reaction of superphosphoric acid with ammonia in a pipe reactor. The polyphosphoric acid can be represented by the formula:

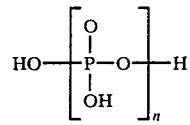

When n equals 1, the formula represents orthophosphoric acid. When n equals 2, the formula represents pyrophosphoric acid. When n equals 3, the formula represents tripolyphosphoric acid. When n equals 4, the formula represents tetrapolyphosphoric acid, and when n is greater than 4, the formula represents the higher polyphosphoric acids.

When such polyphosphoric acids are reacted with ammonia, some of the hydroxy groups of the formula are converted to —ONH₄ radical. Where one such conversion occurs per molecule, the resulting product is known as monoammonium polyphosphate, and where two such conversions occur, the resulting product is known as diammonium polyphosphate.

U.S. Pat. No. 3,879,209, at column 5, lines 1–11, states that a particularly suitable ammonium phosphate for the production of a phosphate bonded magnesia cement is a "commercial product" used primarily as agricultural fertilizetr, further describing such a solution as an aqueous solution containing as much ammonium polyphosphate as can be dissolved (column 3, lines 29–31). This patent does not further discuss any variability of the final product resulting from possible variations in the commercial 10-34-0 solution, but instead presents results for such a product having a typical analysis.

U.S. Pat. No. 4,059,455, issued to the same inventors and assignee as U.S. Pat. No. 3,879,209, illustrates the variability of nominal 10-34-0 solutions. Example I of U.S. Pat. No. 4,059,455 sets forth seven different compositions of a nominal 10-34-0 solution prepared in a pipe reactor, wherein wet process superphosphoric acid is reacted with gaseous ammonia to produce the nominal fertilizer solution. The pipe reactor process differs in many respects from the process for producing ammonium phosphate solutions wherein polyphosphoric acid is reacted with ammonium hydroxide. As set forth in the second table of Example I of U.S. Pat. No. 4,059,455 at column 8, lines 4–11, the seven different nominal 10-34-0 concentrations, apparently produced in the same pipe reactor, produced set times ranging from 8-½ to 24 minutes. The results of these tests are summarized in FIG. 4 of that patent, which predicts an even greater expected variation in setting time for commercial variations of a single variable, the polyphosphate concentration in percent.

As will be described in more detail subsequently, the present inventors have found that yet greater variations in setting time and properties of phosphate-bonded magnesia cement result from the use of commercialljy purchased 10-34-0 fertilizer compositions. Such variations can occur from manufacturer to manufacturer, and can even occur for different batches of product produced by the same manufacturer. The variations of the 10-34-0 fertilizer products and the resulting magnesia cements are not unexpected, inasmuch as the 10-34-0 compositions are prepared primarily to meet fertilizer compositional standards rather than any standards relating to manufacture of cements.

The aforementioned U.S. Pat. Nos. 3,879,209 and 4,059,455 recognize that varying properties can be achieved from polyphosphate contents of the 10-34-0 solutions lying within higher or lower ranges, but there is no assurance that standardization of only the polyphosphate content would result in uniform setting times of the cement products, as many other compositional factors may vary also. The establishing of compositional limits on other variables results in significantly increased manufacturing or screening costs. Most high volume uses of phosphate-bonded magnesia cements occur under conditions wherein it is difficult to maintain and enforce highly restrictive specifications, as, for example, in the patching of cracks in highways. In such applications, the chemicals may be stored under a variety of conditions for long periods of time, during which time the compositional indicators such as polyphosphate content may change due to reactions in the stored product. It is difficult to maintain the desired uniformity of setting time by relying upon the character of the solution used in the cement-manufacturing reaction, if the present invention is not employed.

In accordance with the present invention, a phosphate-bonded magnesia cement is prepared by mixing together three components: a first component consisting essentially of an aqueous solution containing ammonia and phosphate, a second component consisting essentially of a solid phosphate in the form of a divided solid or a liquid mixture, and a third component consisting essentially of magnesium oxide. A fourth component including fillers, colorants, waterproofing agents or other additions may optionally be combined with the first three components. In one embodiment, the second component is provided as a finely divided solid phosphate in aqueous solution or in solid form. The three components may be mixed together essentially simultaneously to form a cement, or the solid phosphate component (in liquid mixture or as a dry solid) may be mixed pairwise with either of the first or third components to form a reactant, before mixing with the remaining component to form a cement.

In one embodiment, the first component containing ammonium and phosphate in solution is a fertilizer composition such as 10-34-0. The solid phosphate second component may be any solid phosphate in a finely divided form, as, for example, a solid phosphate passing through a 200 mesh screen. The magnesium oxide third component may be any reactive or nonreactive form, and is preferably present in an amount of at least about 25 percent by weight of the total of the first three components. These three components may be mixed simultaneously, or the solid phosphate second component may first be mixed with one of the other two components.

The preferred commercial approach is first to mix a dry solid phosphate with the dry solid magnesium oxide, forming a dry solid mix useful as a reactant in making cement. This mix is then combined with the ammonium phosphate solution to form the cement. The dry mix may be prepared at the use site, or the phosphate may be mixed into the magnesium oxide at a central location before shipment. The dry mix exhibits no deterioration with time, and is believed to have an indefinitely long shelf life. A slight separation of the phosphate and magnesium oxide solids during shipment or storage is not harmful, as the mixing with the ammonium phosphate ensures redistribution. At the use site, the dry mix is mixed with the ammonium phosphate solution first component, and then applied to harden into a cement.

In accordance with another embodiment of the present invention as applied in a commercial environment, a reactant useful in manufacturing a phosphate-bonded magnesia cement may be prepared by mixing together the first component consisting essentially of an aqueous solution containing ammonia and phosphate, together with the second component consisting essentially of solid ammonium phosphate either in dry solid form or as a liquid mixture, the second component preferably being present in an amount of at least about 1 percent by volume of the total volume of the first and second components.

The first component, typically comprising the major portion of the reactant of this embodiment, is preferably an ammonium phosphate solution such as that prepared for fertilizer applications, including, for example, the widely available 10-34-0 and 11-37-0 compositions. The first component is an aqueous solution, with all of the ammonium phosphate in solution. As will be described in relation to the examples set forth below, within the constraint of this limitation the first component may vary widely in composition and character, and it is a principal advantage of the present invention that such widely varying first components may be utilized to produce a phosphate-bonded magnesia cement having a relatively uniform, predictable setting time, when mixed in accordance with the present invention. The ammonia and phosphate are present in such fertilizer solutions primarily in their dissociated ionic forms, but the use of the present invention is not so limited.

The second component, which is mixed with the first component to produce a reactant useful in manufacturing the phosphate-bonded magnesia cement having a stabilized setting time, consists essentially of a solid ammonium phosphate, either dry or in a mixture with a liquid, preferably water. If an aqueous mixture is used, it may be prepared by mixing solid ammonium phosphate powder or granules into water, with the ammonium phosphate being present in a sufficiently large amount that solids will remain after mixing. That is, it is recogized that in this embodiment the component will have some ammonium phosphate dissolved in the water, by virtue of the solubility constant of ammonium phosphate in water. The ammonium phosphate should be present in a sufficient excess that solid ammonium phosphate will remain even after dissolution occurs.

In the alternative, and preferably, the second component may be prepared as a fertilizer product having amminium phosphate present at a concentration greater than the solubility limit of ammonium phosphate in water at ambient temperature. An example of such a fertilizer is 18-46-0. In such a product, the solid ammonium phosphate is typically present as a slurry of solid particles in a saturated or nearly saturated solution. There is no known limitation on the composition or character of the solid ammonium phosphate in the second component. For example, the ammonium phosphate in the second ingredient may be a monoammonium phosphate or a diammonium phosphate, or a mixture of the two.

The reactant of this embodiment is prepared by mixing together the first component and the second component by any process which ensures a thorough mixing of the two. Because the second component is preferably presented in the form of a mixture or slurry of ammonium phosphate in water, the mixing technique must be sufficiently vigorous to ensure that the solid phase is distributed throughout the volume of the reactant. Acceptable mixing techniques include cocurrent turbulent mixing and mechanical mixing using paddles, for example.

In all embodiments, the solid phosphate should be present in an amount sufficiently great to produce the desired stabilizing effect in the skinning and setting times of the phosphate-bonded magnesia cement. Smaller concentrations of solid phosphate have a different effect than larger concentrations. For the conditions described in relation to Example II below, 0.1 percent solid phosphate additions resulted in longer setting times than 1.0 or 10.0 percent additions, but the variation of the average setting time was small, even with a variation in solid phosphate concentration of two orders of magnitude. Thus, in one sense the setting time is relatively insensitive to small variations in solid phosphate concentration, a desirable feature for a product to be used under widely varying conditions, often by chemically unskilled persons. Setting time may be considered as only weakly dependent upon the amount of solid phosphate in the reactant. On the other hand, if a precise setting time is required for a specific application, the solid phosphate concentration required to produce that setting time may be determined exactly, as by the method illustrated in Example II. This precise concentration may then be specified for preparation of cements. Solid phosphate contents greater than about 10 percent are not preferred, inasmuch as the cost of the phosphate increases the cost of the cement and the change in setting time is not significant.

If the solid phosphate is provided in a liquid mixture, the selected amount of solid phosphate may be provided by including a larger amount of solid phosphate in the liquid mixture and an overall proportionately smaller amount of the liquid mixture or, conversely, a lower level of solid phosphate in the liquid mixture and a larger total amount of the liquid mixture, as long as the total amount of solid phosphate in the mixture is at the selected level.

When the first and second components are provided in a premixed form, the required amounts of the first and second components may be mixed together either immediately prior to preparing the magnesia cement by mixing in the third component, or, alternatively, may be mixed together well prior to the preparation of the magnesia cement. Tests have indicated that the shelf life of the reactant formed by premixing the first and second components is at least 1 month after mixing. The more finely divided is the solid ammonium phosphate, the longer is the expected time before the ammonium phosphate is deposited out of the reactant. However, even if the solid ammonium phosphate is deposited, the effectiveness of the reactant may be restored by again thoroughly mixing the first and second components to reestablish the uniformity of the mixture. Thus, the reactant has at least a 1 month shelf life without remixing and apparently a shelf life of indefinite duration if the reactant is remixed as by aggitation prior to use in preparing the phosphate-bonded magnesia cement.

A phosphate-bonded magnesia cement is prepared by mixing the reactant prepared as described previously with an appropriate amount of magnesium oxide, such as dead burned magnesia. The magnesium oxide typically is present in an amount of at least about 25 percent by weight of the three components. After the reactant and the magnesium oxide are mixed together, the mixing may be applied to a surface or placed in a form within the period of the working time, wherein the working time is the time during which the mixture remains substantially flowable and unhardened. As set out in the examples discussed below, the cements in accordance with the present invention have predictable skinning times of about 2 to about 10 minutes. Once the period for working has passed, the chemical reaction between the components continues until the cement is fully hardened, this period of time from the initial mixing to the hardening being denoted as the setting time. In the embodiment using a 10-34-0 and 18-46-0 reactant, this setting time is about $12.5 \pm 3.5$ minutes. Other relatively inert materials or special purpose additives may be mixed into the mixture of the reactant and the magnesium oxide to produce cements having special properties, or mortars or concretes as desired. Inert materials to produce mortars or concrete can include fibers, sand, gravel, finely divided minerals, crushed brick, or other materials, for example. Additives to produce special purpose concretes or cements can include, for example, colorants, acrylics, or waterproofing agents. Such additions are not known to affect the operability of the present invention, either in this or other embodiments.

In the preferred form of this embodiment of the invention, the first component is a nominal 10-34-0 ammonium phosphate solution prepared primarily for use in fertilizer applications. The second component is an 18-46-0 composition having at least about 50 percent diammonium phosphate and having sufficient solid material that the overall $P_2O_5$ concentration in the component is 35 percent by weight. The amount of the 18-46-0 second component mixed with the first component is preferably from about 1 to about 5 percent by volume, and most preferably about 2 percent by volume. Upon mixing, the reactant is a liquid having solid ammonium phosphate dispersed therethrough, and having a cloudy appearance. A preferred phosphate bonded magnesia cement is prepared by mixing about 6 pounds of dead-burned magnesia with 1 gallon of this reactant, applying this mixture while workable to a surface, and then waiting for the mixture to harden.

The following examples will serve to illustrate the application and pracftice of the present invention, but are presented only to illustrate the preferred embodiment and advantages of the invention, and should not be interpreted as limiting the scope of the invention in any respect.

EXAMPLE I

Six samples of nominal 10-34-0 fertilizer material were obtained from four different manufacturers on a variety of dates. The manufacturers, dates obtained, and analyzed chemical compositions and characteristics of the six samples are summarized in the following Table 1:

TABLE 1

| PRODUCT | | Compositions in Weight Percents | | | | | | | | | |
|---|---|---|---|---|---|---|---|---|---|---|---|
| | | $P_2O_5$ | $SO_4$ | $NH_3$ | Poly* | $Fe_2O_3$ | $V_2O_5$ | $AL_2O_3$ | pH | Viscosity | $KfH_2O$ |
| B & B | 7-1 | 33.8 | 2.1 | 10.2 | 54.9 | 0.46 | 0.11 | 1.00 | 6.0 | 36.5 | 28.2 |
| Helm | 10-23 | 34.6 | 3.3 | 10.2 | 63.6 | 0.45 | 0.09 | 0.98 | 5.9 | 38.1 | 29.5 |
| B & B | 10-28 | 34.0 | 2.6 | 10.1 | 67.1 | 0.35 | 0.02 | 1.10 | 6.1 | 37.5 | 27.1 |
| Pocatello | 9-26 | 34.3 | 2.1 | 10.3 | 67.7 | 0.36 | 0.13 | 1.03 | 6.2 | 35.5 | 29.2 |
| Pure Gro | 10-31 | 34.0 | 3.3 | 10.7 | 66.6 | 0.38 | 0.09 | 1.12 | 6.4 | 45.3 | 22.9 |
| Helm | 12-5 | 34.1 | 2.0 | 10.1 | 75.5 | 0.40 | 0.10 | 0.73 | 5.9 | — | 24.7 |

*All phosphates that are not orthophosphates.

A reactant in accordance with the present invention was prepared utilizing each of the six purchased samples of nominal 10-34-0 as the first component. The second component used to prepare the reactant was 18-46-0 fertilizer containing equal parts by weight of monoammonium and diammonium phosphate, with the concentration of phosphates such that the overall $P_2O_5$ concentration in the slurry is 35 percent by weight. Two percent by volume of this second component was mixed with 98 percent by volume of the 10-34-0 first component, with one mixture being prepared for each of the six purchased nominal 10-34-0 products. The first component and the second component were mixed together by hand with moderate agitation for about ½-1 minute. A phosphate bonded magnesia cement was then prepared by mixing 6 pounds of dead burned magnesia with 1 gallon of the reactant prepared as just described. The skin time was determined visually and by touch. The set time was determined as the time required for the cement to resist penetration through its thickness by a pointed rod of diameter about ¼ inch.

Table 2 summarizes the results of the working or skinning time and setting time determinations, for cements made by utilizing the nominal 10-34-0 composition only, and also for cements made by utilizing the reactant of the present invention, prepared as just described by mixing 10-34-0 solution with 10-46-0 slurry):

TABLE 2

| | | 10-34-0 Only | | 10-34-0 Mixed With 18-46-0 | |
|---|---|---|---|---|---|
| PRODUCT | | Skin Time | Set Time | Skin Time | Set Time |
| B & B | 7-1 | 2.0 | 14.0 | 7.5 | 9.5 |
| Helm | 10-23 | 2.0 | 5.0 | 6.0 | 11.0 |
| B & B | 10-28 | 2.5 | 6.5 | 5.0 | 9.0 |
| Pocatello | 9-26 | 2.5 | 7.5 | 7.0 | 12.0 |
| Pure Gro | 10-31 | 5.0 | 23.0 | 8.0 | 16.0 |
| Helm | 12-5 | 4.5 | greater than 10 hours | 9.5 | 16.0 |

(All times in minutes, except as noted)

As can be seen from Table 2, the addition of the 18-46-0 slurry to the various commercial 10-34-0 solutions stabilizes the skinning times to about 12.5±3.5 minutes. Compared with 10-34-0 used without the 18-46-0 addition, the shortest setting times are lengthened and the longest times are shortened, so that the setting time is relatively uniform and predictable. This stabilization of the setting time to a predictable value having a small variation between commercially purchased samples of 10-34-0 is a distinct advantage to the user of the cements, as it is not necessary to establish narrow product specifications for the 10-34-0 solution. Also, the user may plan, with certainty, for use of the cement structure in about 15-20 minutes after application.

EXAMPLE II

The second component may also be provided as a solid or as a solid mixed with water, other than a material prepared primarily as a fertilizer composition. The second component may also be a phosphate other than an ammonium phosphate.

To demonstrate the range of types and forms of second components, cements were made by mixing together a 10-34-0 first component, in an amount of 70 percent by weight less the amount of the second component, a solid phosphate second component in an amount of 0.1, 1.0, or 10.0 percent of the total weight, and 30 percent by weight dead-burned magnesium oxide. The first component was Pocatello commercial 10-34-0 fertilizer manufactured by the J. R. Simplot Co. As a test standard, a cement was prepared from the 10-34-0 and magnesium oxide, without any addition of the second component. The skinning time of this cement was found to be 7 minutes, and the setting time over 4 hours, as determined by the approach described in Example I.

The cements made using a second component were formulated by two different approaches. In the first, the second component was furnished as a dry powder which was mixed with the other two components. In the second, the second component was first mixed with water, so that this mixture had 65 percent solids by weight. This mixture was then mixed with the remaining two components to form the cement.

Seven different phosphates were tested, and each phosphate was tested at levels of 0.1 percent, 1.0 percent and 10 percent by weight. The results are summarized in Table 3:

TABLE 3

| | | Time, Minutes | | | |
|---|---|---|---|---|---|
| | % By | 65% Solids | | Dry | |
| Second Ingredient | Weight | Skin | Set | Skin | Set |
| Diammonium phosphate | 0.1 | 3 | 90 | 3 | 90 |
| (reagent grade) | 1.0 | 3 | 34 | 3 | 60 |
| | 10.0 | 3 | 23 | 3 | 21 |
| Diammonium-monoammonium | 0.1 | 4 | 29 | 4 | 28 |
| phosphate mixture | 1.0 | 6 | 18 | 6 | 21 |
| (50-50 mixture) | 10.0 | 3 | 20 | 3 | 19 |
| Monoammonium phosphate | 0.1 | 4 | 29 | 3 | 27 |
| | 1.0 | 4 | 17 | 4 | 17 |
| | 10.0 | 3 | 15 | 3 | 7 |
| Monosodium phosphate | 0.1 | 4 | 35 | 3 | 32 |
| (reagent grade) | 1.0 | 3 | 29 | 3 | 28 |
| | 10.0 | 2 | 10 | 3 | 12 |
| Disodium phosphate | 0.1 | 3 | 25 | 3 | 24 |
| (reagent grade) | 1.0 | 3 | 24 | 3 | 24 |
| | 10.0 | 3 | 19 | 2 | 15 |
| Monopotassium phosphate | 0.1 | 4 | 32 | 4 | 30 |
| (reagent grade) | 1.0 | 3 | 24 | 3 | 22 |
| | 10.0 | 2 | 18 | 3 | 14 |
| Dipotassium phosphate | 0.1 | 4 | 30 | 3 | 29 |
| (reagent grade) | 1.0 | 3 | 29 | 3 | 26 |
| | 10.0 | 3 | 15 | 2 | 18 |

In all instances, the skinning times were about 4±2 minutes. Except for the reagent grade diammonium phosphate, the observed setting times were largely independent of the type of phosphate. The setting times were only weakly dependent on the concentration of the the second component, being 22±13 minutes for all concentrations and types of solid phosphate. While this variation is rather large, in comparison to the 4 hour setting time of untreated 10-34-0, there is significant stabilization. Upon closer analysis, the setting time is seen to depend weakly upon concentration, the average and range being shown in Table 4:

TABLE 4

| Second Component, Percent by Weight | Set Time, Minutes |
|---|---|
| 0.1 | 29 + 6 |
| 1.0 | 23 ± 6 |
| 10.0 | 15 ± 8 |

Table 4 shows that the setting time decreases with increased concentration of second ingredient, but the dependence on concentration is weak (keeping in mind that the concentration range investigated varies by a factor of 100, but the setting time varies only by a factor of 2). This weak dependence is an important advantage, as it is anticipated that the present invention may be used by relatively unskilled persons in field situations, where errors in determining concentrations may be made. The approach of the present invention is tolerant of possible errors, while retaining operability. For example, if the worker accidentally adds twice or half as much of the second component as prescribed, the variation in setting time is expected to be at most on the order of about 1 minute. The procedure is also insensitive to variation in the order of mixing, i.e., adding the second component dry or as a water slurry.

Further, as shown in Table 4, the present invention allows some control over the setting time, within narrow limits. The recommended phosphate addition can be reduced to achieve a setting time of about 30 minutes, or increased to achieve a setting time of about 15 minutes. In most applications, control of setting time to this precision is not necessary, and the preferred phosphate addtion is in the range of about 0.1 to about 1 percent. Lower additions raise the possibility of incomplete mixing and ineffectiveness of the very small amount of second ingredient, while amounts larger than 1.0 percent become expensive, without a significant change in setting time.

The above discussion in relation to TABLE 4 excludes reagent grade diammonium phosphate, which is operable to produce stabilization of setting times, but at somewhat longer setting times and with more variation than for other phosphates. It is therefore preferred that pure reagent grade diammonium phosphate not be used for general field applications wherein 15–30 minute setting times are desired. On the other hand, the reagent grade diammonium phosphate is preferred where stabilized but longer setting times are desired.

Although a particular embodiment of the invention is described in detail for purposes of illustration, various embodiments may be made without departing from the spirit and scope of te invention. Accordingly the invention is not to be limited except as by the appended claims.

What is claimed is:

1. A process for preparing a reactant for use in making a phosphate-bonded magnesia cement, comprising the step of mixing together a first ingredient consisting essentially of a source of ammonium and phosphate, wherein the ammonium and phosphate are in aqueous solution with the phosphate present as a polyphosphate, and a second ingredient consisting essentially of a solid orthophosphate, the solid orthophosphate being at least in part insoluble in the source of ammonium and phosphate and being present in an amount of from about 0.1 to about 10 percent by weight of the total of the first ingredient and the solid orthophosphate.

2. The process of claim 1, wherein the solid phosphate is provided to said mixing step as a slurry of a solid in a water medium.

3. The process of claim 1, wherein the first ingredient is selected from the group consisting of 10-34-0 and 11-37-0 fertilizer composition.

4. The process of claim 1, wherein the first ingredient is of a 10-34-0 fertilizer composition.

5. The process of claim 1, wherein the solid phosphate is provided as dry, solid particles.

6. The process of claim 1, wherein the solid phosphate is provided in a mixture with a liquid medium.

7. The process of claim 1, wherein the solid phosphate is selected from the group consisting of diammonium phosphate, monoammonium phosphate, monosodium phosphate, disodium phosphate, monopotassium phosphate, dipotassium phosphate, and mixtures thereof.

8. A reactant prepared by the process comprising the step of mixing together a first ingredient consisting essentially of a source of ammonium and phosphate, wherein the ammonium and phosphate are in aqueous solution with the phosphate present as a polyphosphate, and a second ingredient consisting essentially of a solid orthophosphate, the solid orthophosphate being at least in part insoluble in the source of ammonium and phosphate and being present in an amount of from about 0.1 to about 10 percent by weight of the total of the first ingredient and the solid orthophosphate.

9. A process for preparing a cement, comprising the steps of mixing together a first component, a second component, and a third component, which react together to form a cement, the first component consisting essentially of an aqueous source of soluble ammonium and phosphate with the phosphate present as a polyphosphate, the second component consisting essentially of a solid orthophosphate which is substantially insoluble in the first component, the second component being present in an amount of from about 0.1 to about 10 percent by weight of the total of the first component and the second component, and the third component consisting essentially of magnesium oxide, the cement having a stabilized setting time.

10. The process of claim 9, wherein the first and second components are mixed together prior to mixing with the third component.

11. The process of claim 9, wherein the second and third components are mixed together prior to mixing with the first component.

12. The process of claim 9, including the further step of
mixing a fourth component with the first, second, and third components, the fourth component being selected from the group consisting of an inert filler, a colorant, an acrylic, and a waterproofing agent.

13. The process of claim 9, wherein the first component is a fertilizer material.

14. The process of claim 9, wherein the first component is selected from the group consisting of 10-34-0 and 11-37-0 fertilizer composition.

15. The process of claim 9, wherein the second component is a dry, solid phosphate.

16. The process of claim 9, wherein the second component is provided in a mixture of a solid phosphate and a liquid medium.

17. The process of claim 9, wherein the second component is a fertilizer material.

18. The process of claim 9, wherein the second component is 18-46-0 fertilizer composition.

19. A cement made by the process comprising the step of mixing together a first component, a second component, and a third component, which react together to form a cement, the first component consisting essentially of an aqueous source of soluble ammonium and phosphate with the phosphate present as a polyphosphate, the second component consisting essentially of a solid orthophosphate which is substantially insoluble in the first component, the second component being present is an amount of from about 0.1 to about 10 percent by weight of the total of the first component and the second component, and the third component consisting essentially of magnesium oxide, said cement having a stabilized setting time.

20. The process of claim 9, including the further step of:
casting said cement into place to form a cement product.

21. A cement product made by the process comprising the steps of mixing together a first component, a second component, and a third component, which react together to form a cement, the first component consisting essentially of an aqueous source of soluble ammonium and phosphate with the phosphate present as a polyphosphate, the second component consisting essentially of a solid orthophosphate which is substantially insoluble in the first component, the second component being present in an amount of from about 0.1 to about 10 percent by weight of the total of the first component and the second component, and the third component consisting essentially of magnesium oxide, said cement having a stabilized setting time and casting said cement into place to form a cement product.

22. A process for preparing a phosphate-bonded magnesia cement, comprising the step of mixing together:
a mixture of magnesium oxide and a solid orthophosphate, the solid orthophosphate being present in an amount of from about 2 to about 23 percent by weight of the total of the magnesium oxide and the solid orthophosphate; and
an aqueous source of soluble ammonium and phosphate in the form of ammonium polyphosphate.

23. The process of claim 22, wherein the mixture of magnesium oxide and solid phosphate is dry prior to said step of mixing.

24. The process of claim 22, wherein the solid phosphate is selected from the group consisting of diammonium phosphate, monoammonium phosphate, monosodium phosphate, disodium phosphate, monopotassium phosphate, dipotassium phosphate, and mixtures thereof.

25. The process of claim 22, wherein the aqueous source of soluble ammonium and phosphate is a 10-34-0 fertilizer composition.

26. A cement prepare by the proces comprising the step of mixing together
a mixture of magnesium oxide and a solid orthophosphate, the solid orthophosphate being present in an amount of from about 2 to about 23 percent by weight of the total of the magnesium oxide and the solid orthophosphate; and
an aqueous source of soluble ammonium and phosphate in the form of ammonium polyphosphate.

* * * * *